(12) United States Patent
Nobis et al.

(10) Patent No.: US 6,404,486 B1
(45) Date of Patent: Jun. 11, 2002

(54) DEVICE FOR DETERMINING THE GEOMETRY OF A WHEEL AND/OR AXLE IN MOTOR VEHICLES

(75) Inventors: Guenter Nobis, Wendlingen; Volker Uffenkamp, Aalen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,380

(22) PCT Filed: Dec. 21, 1998

(86) PCT No.: PCT/DE98/03743

§ 371 (c)(1),
(2), (4) Date: Mar. 19, 2001

(87) PCT Pub. No.: WO99/34166

PCT Pub. Date: Jul. 8, 1999

(30) Foreign Application Priority Data

Dec. 23, 1997 (DE) .......................................... 197 57 763

(51) Int. Cl.⁷ .............................. G01B 11/26; G01B 7/30
(52) U.S. Cl. ................................ 356/139.09; 33/203.18
(58) Field of Search .................... 356/139.09; 33/203.18

(56) References Cited

U.S. PATENT DOCUMENTS

| 5,532,816 A | * | 7/1996 | Spann et al. ........... 356/139.09 |
| 5,675,515 A | | 10/1997 | January |
| 5,724,129 A | * | 3/1998 | Matteucci .............. 356/139.09 |
| 5,870,315 A | * | 2/1999 | January .................. 356/139.09 |

FOREIGN PATENT DOCUMENTS

| DE | 29 48 573 | 6/1981 |
| DE | 4212426 | 7/1993 |
| DE | 36 18 480 | 5/1995 |
| DE | 44 09 198 | 9/1995 |
| DE | 196 14 564 | 10/1996 |
| DE | 195 28 798 | 2/1997 |
| DE | 19531652 | 5/1997 |
| DE | 197 57 763 | 7/1999 |
| EP | 0 587328 | 3/1994 |
| EP | 0 803703 | 10/1997 |

* cited by examiner

Primary Examiner—Stephen C. Buczinski
(74) Attorney, Agent, or Firm—Kenyon & Kenyon

(57) ABSTRACT

A device for determining the wheel and axle geometry of motor vehicles in an inspection room using an optical measuring device having at least one optical image pick-up device from at least two different perspectives, having a marking device, which includes a measuring feature arrangement existing or arranged on the wheel, and having an evaluation device. The determining the geometrical wheel and axle data is simplified in that the marking device has at least one reference feature arrangement including at least three reference features per image recording position; that the inspection room is defined between the reference feature arrangement(s) and the base plane of the measuring station; that the position of the reference features in the inspection room is known in the evaluation device; and that the measuring feature arrangement includes at least three measuring features per wheel.

14 Claims, 2 Drawing Sheets

DEVICE FOR DETERMINING THE GEOMETRY OF A WHEEL AND/OR AXLE IN MOTOR VEHICLES

BACKGROUND OF THE INVENTION

The present invention relates to a device for determining the wheel and/or axle geometry of motor vehicles in an inspection room using an optical measuring device having at least one optical image pick-up device from at least two different perspectives, having a marking device, which includes a measuring feature arrangement existing or arranged on the wheel, and having an evaluation unit.

A device of this kind is described in the German Patent No. DE 42 12 426 C 1. In the case of this known device, to determine a vehicle's wheel track and camber, characteristic regions of the wheels are recorded by video cameras. The wheel in question is provided outside of its axle with a marking that is able to be registered optically. The marking is recorded during rotation of the wheel by two synchronized video cameras. The relative positions of the corresponding axles are determined from the spatial positions of the markings on the wheels. The video cameras are arranged symmetrically to the axle of the corresponding wheel, the vehicle resting on rollers, and the wheels turning in roller prisms. When this system is used, the possibilities for measuring wheel or axle geometries are limited to wheel track and camber measurements, and substantial outlay is required to adjust the axle geometry. It is not possible to correct the axle geometry on the roller test stand.

SUMMARY OF THE INVENTION

The object of the present invention is to make available a device of the type mentioned at the outset, which, while providing a simplified operation, will enable one to obtain more information with respect to wheel or axle geometry, and which will permit corrections to be made on the chassis during the measuring operation (for example, above an inspection pit). There is no need for adjustment of the image pick-up device.

The present invention provides that the marking device has a reference feature arrangement including at least three reference features per image recording position, the position of the reference features in the inspection room being known in the evaluation device, and that the measuring feature arrangement includes at least three measuring features per wheel.

Using this device, the driving axis and, in addition, geometrical wheel and axle data named in the following can be automatically determined arithmetically in the evaluation device, using known algorithms: individual track for each wheel, total track for each wheel pair, camber for each wheel, front/back wheel offset, right/left lateral offset, track width difference, axle offset, steering angle, caster, steering axis inclination, and toe-out on turns, as well as the position of the multi-link independent suspension as a function of the steering angle of each steered wheel, it being extremely simple to position the image pick-up device, due to the integration of the reference features. With the aid of the reference features known in the evaluation device, one can initially determine the camera position and, simultaneously or subsequently, the position of the measuring features relative to the reference features, and from this, one can then derive the mentioned geometrical wheel and axle values.

A simple design, including reference features that are able to be reliably detected, is achieved in that the reference feature configuration has a mount support unit, on which the reference features are provided in the form of reference structures or specially applied reference marks. This enhances the reliability of the measuring results.

If the reference features are not only arranged in an even, planar configuration, but also spatially offset with respect to the image pick-up device, then the evaluation is simplified, as compared to an even configuration of the reference features, while ensuring substantial reliability of the measuring results.

To reliably detect the markings, further benefit is derived from measures which provide for the reference features and/or the measuring features to be designed as retro-reflecting marks, and the image pick-up device as a camera.

If automobile body structures or additional, specially applied automobile body markings are provided as additional measuring features, which are able to be recorded by at least one image pick-up device and included in the evaluation, then, using the same device, in parallel with the geometrical wheel and axle data, one can detect the deflection or load status for each wheel, and/or the inclination of the automobile body in the longitudinal and transverse direction, and if indicated, consider them in vehicle-specific correction calculations.

A cost-effective design of the device is achieved in that, given a static measuring task, only one image pick-up device is provided, which is able to be positioned sequentially at two different positions to mutually detect, in each case, all wheels of the vehicle, or sequentially at two different positions per vehicle side, to mutually detect, in each case, all wheels of this vehicle side, or sequentially, at two different positions per wheel, and that, using the evaluation device, the sequentially recorded image data are able to be stored and evaluated.

In comparison, a simplified operation is achieved in that one measuring unit is provided with at least two image pick-up devices, which are able to be arranged at only one position to jointly record all wheels of the vehicle, sequentially on both vehicle sides at only one position each to jointly record all wheels per vehicle side, or sequentially at only one position per wheel, and that, using the evaluation device, the sequentially recorded image data are able to be stored and evaluated.

A further simplified operation is achieved in that two measuring units are each provided with at least two image pick-up devices; that the two measuring units are placed on both sides of the vehicle in such a way that they each detect the wheels of one vehicle side; or that the two measuring units are placed on one vehicle side in such a way that each detects one wheel; and that both vehicles sides are sequentially detected; or that the two measuring units are placed in such a way that, in each case, one wheel of one vehicle axle is detected on both vehicles sides, and the vehicle axles are sequentially detected; and that using the evaluation device, the sequentially recorded image data are able to be stored and evaluated and; in addition, in that four measuring units are each provided with at least two image pick-up devices to simultaneously record of four wheels of the vehicle.

The acquisition of the measuring data and the evaluation are enhanced in that one measuring unit includes at least three cameras.

The measure which provides for using at least one light source to illuminate the-measuring features and the reference features further enhances the ability to detect the measuring features and the reference features. Having at least one light source in the vicinity of the lens of the image pick-up device(s) facilitates the detection of retro-reflecting measuring and reference features. If provision is made in this context for the light sources to be infrared light-emitting diodes, then any degradation in the light conditions is avoided for the operator of the device at the measuring site.

The wheel features a plurality of vehicles, or also a plurality of measuring stations can be automatically distinguished in that at least one measuring mark per wheel or per vehicle, and/or at least one reference feature bears a coding that is detectable by the image pick-up device. In this context, by encoding at least one of the applied wheel marks, it is especially possible as well, to clearly assign the magnitude of a form error of one wheel rim to the corresponding wheel mark, and to allow for it during subsequent measurements or evaluations, i.e., to correct it.

By applying such measures, one can, for the most part, do without a precise leveling of a measuring station. The device does not have any absolute relation to a normal direction, rather exclusively relative relations to the reference arrangement of the measuring station. For that reason, the extent to which the measuring station is required to be even or level can be minimized to that which is required by the vehicle.

This specification of the obtained geometrical data is not limited to angular units; the data can also be provided as absolute units of length.

The need is eliminated for adjusting the measuring device at the wheel, as required by many systems in known methods heretofore. The positioning of the optical image pick-up device diagonally across from a wheel/wheels and the reference arrangement can be carried out in a simple, approximate manner, and be controlled very easily, for example, using positioning aids.

The measured value acquisition itself takes place in fractions of a second, a higher level of accuracy and, at the same time, a larger measuring range being given for all measured quantities.

The need is eliminated for an angular positioning encoder required in known methods heretofore on rotating plates to determine the size of the steering angle, since this angle is defined by the measuring system itself.

Using the same device, the geometrical wheel and axle data of commercial vehicles can be determined at another measuring station, which is designed to accommodate the dimensions of commercial vehicles. For this, no other testing technology is needed.

DETAILED DESCRIPTION

Figure 1:
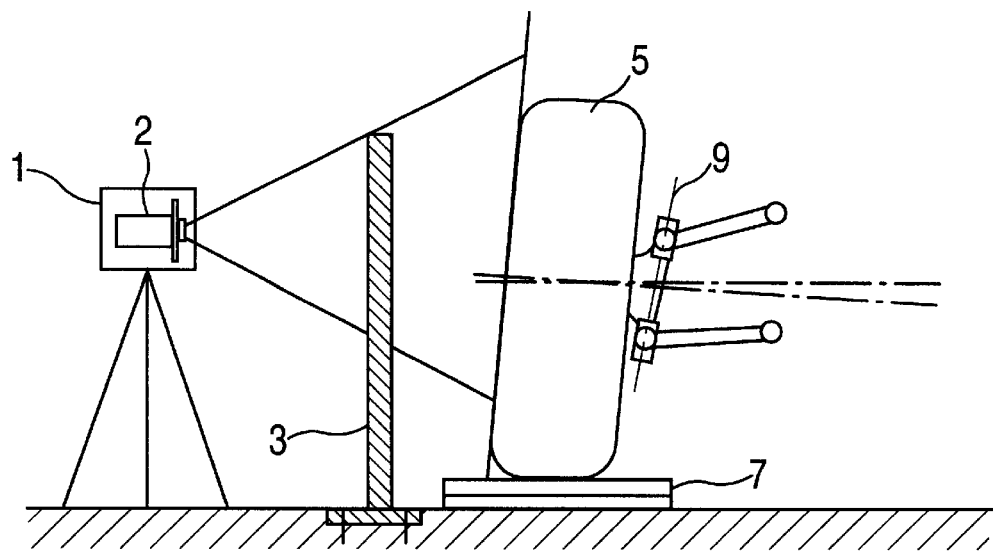
FIG. 1 shows arrangement of a device for determining the wheel and axle geometry, from a view of the device in the longitudinal vehicle direction.
Figure 2:
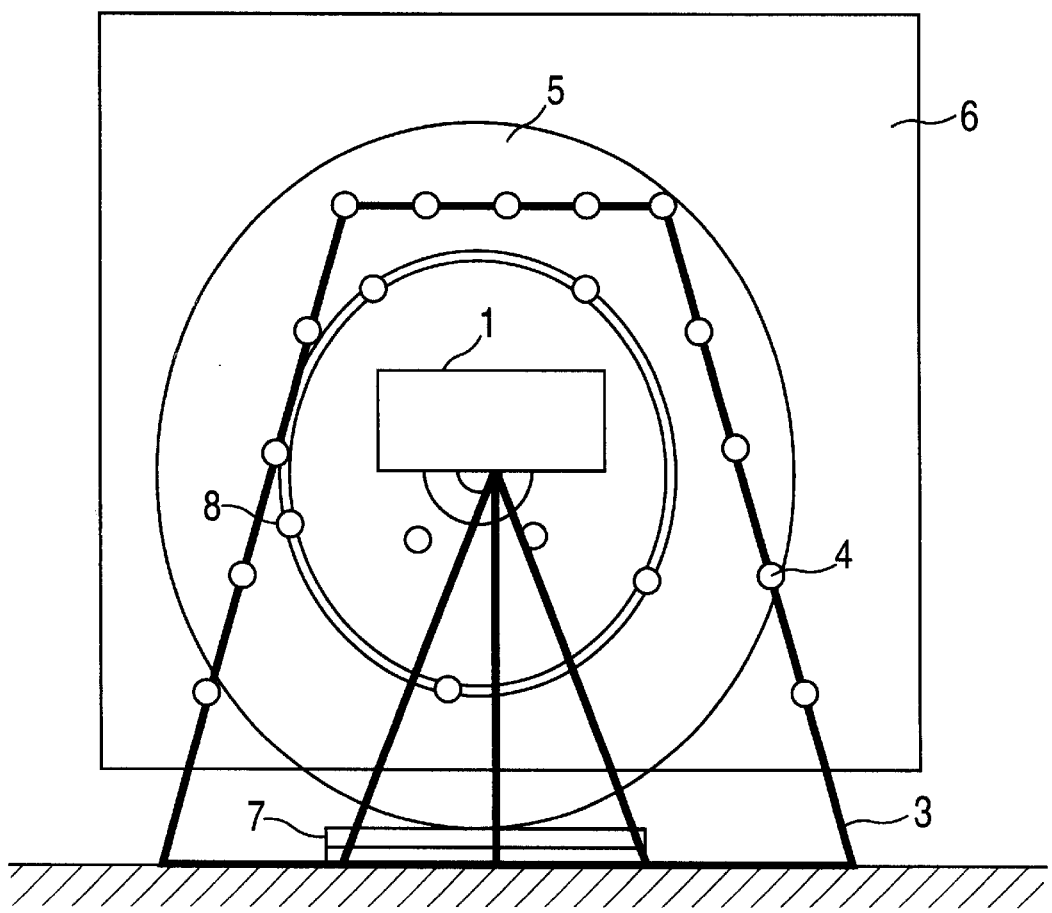
FIG. 2 shows an arrangement corresponding to FIG. 1, in a side view.

FIG. 1 depicts a device for determining the wheel and axle geometry of a vehicle, including a measuring unit 1 arranged to the side of wheel 5 on a tripod, and including a reference feature arrangement 3 disposed between this and wheel 5. As is apparent in connection with FIG. 3, measuring unit 1 predominantly has two image pick-up devices constituted as cameras 2, which record an image segment 6, in which are at least partially situated both wheel 5, as well as reference feature arrangement 3. From the lateral representation in accordance with FIG. 2, one can discern that reference feature arrangement 3 has a trapezoidal frame, having a plurality of reference marks 4, and disposed at the rim flange of wheel 5, distributed circumferentially, are a plurality of measuring marks 8. The front wheel shown in FIGS. 1 and 2 rests on a rotating plate 7, to be able to easily execute a steering motion. Reference feature arrangement 3 includes at least three reference marks 4, while at least three measuring marks 8 are applied to wheel 5. Reference marks 4 and measuring marks 8 are designed to be retro-reflecting. Also shown is a steering-swivel axis 9.

The diameter of the optically, diffusely reflecting reference marks 4 and measuring marks 8, which in this example are circular, is selected as a function of the object-to-image ratio of the camera lens, the size of the receiver element, designed, e.g., as a CCD receiver, and of the object distance. Measuring marks 8 are only to be applied roughly uniformly over the wheel's circumference. In this context, there is no need to adjust wheel marks 8.

Measuring head 1 contains at least two cameras 2, which, from different perspectives and at a sufficient distance, are able to record, at a sufficient distance, wheel 5 and, in particular, the applied reference marks 4 and measuring marks 8. In this context, to achieve a high measuring accuracy, it is advantageous to illuminate the marks from cameras 2. This can be done relatively simply using light sources, for example in the form of light-emitting diodes (LEDs), arranged around the lens, which advantageously radiate light in the infrared range, i.e., in the near infrared range, so that any degradation of the light conditions is avoided for the operator of the device at the measuring location.

Prior to the actual measurement, the vehicle is raised to enable the wheels to rotate freely. The measuring unit, in the form of measuring head 1, is then to be positioned laterally next to wheel 5.

A measuring operation is then begun to define the position By of measuring marks 8 relative to the wheel's axis of rotation. The image is then recorded either in at least three different rotational positions of the wheel, or the wheel in question is set into rotation, and thereby recorded in at least three angle-of-rotation positions (with adequate speed). In the second case, an adequate synchronization of the images ensured. From the recorded images, the position is determined for each measuring mark 8 with respect to the axis of rotation and the plane of rotation, using known triangulation methods. In the case of an ideally formed wheel rim, the planes of rotation of all measuring marks 8 are identical. Deviations among the planes of rotation point to existing form errors with respect to the wheel rim. Generally, these form errors are described as wheel rim wobble. By encoding at least one of the applied measuring marks 8, it is especially possible as well, to clearly assign the magnitude of this form deviation to each mark, and to allow for it during subsequent measurements or evaluations, i.e., to correct it.

This measurement is to be performed at each wheel 5, it being advantageous to apply at least one differently encoded measuring mark 8 at each wheel 5, to be able to automatically distinguish wheels 5 from one another (possibly also a plurality of vehicles, or also a plurality of measuring stations).

The vehicle is then driven, provided this had not already been done when determining wheel rim wobble, onto a generally known measuring station, one that is preferably equipped with rotating plates 7 for front wheels 5, and with a sliding plates for the rear wheels. This measuring station has four reference feature arrangements 3, which define the measuring space above the measuring station, over the base plane of the measuring station, including reference marks 4 attached thereto, whose spatial coordinates (relative to one another) are known on the basis of previous measurements.

Figure 3:
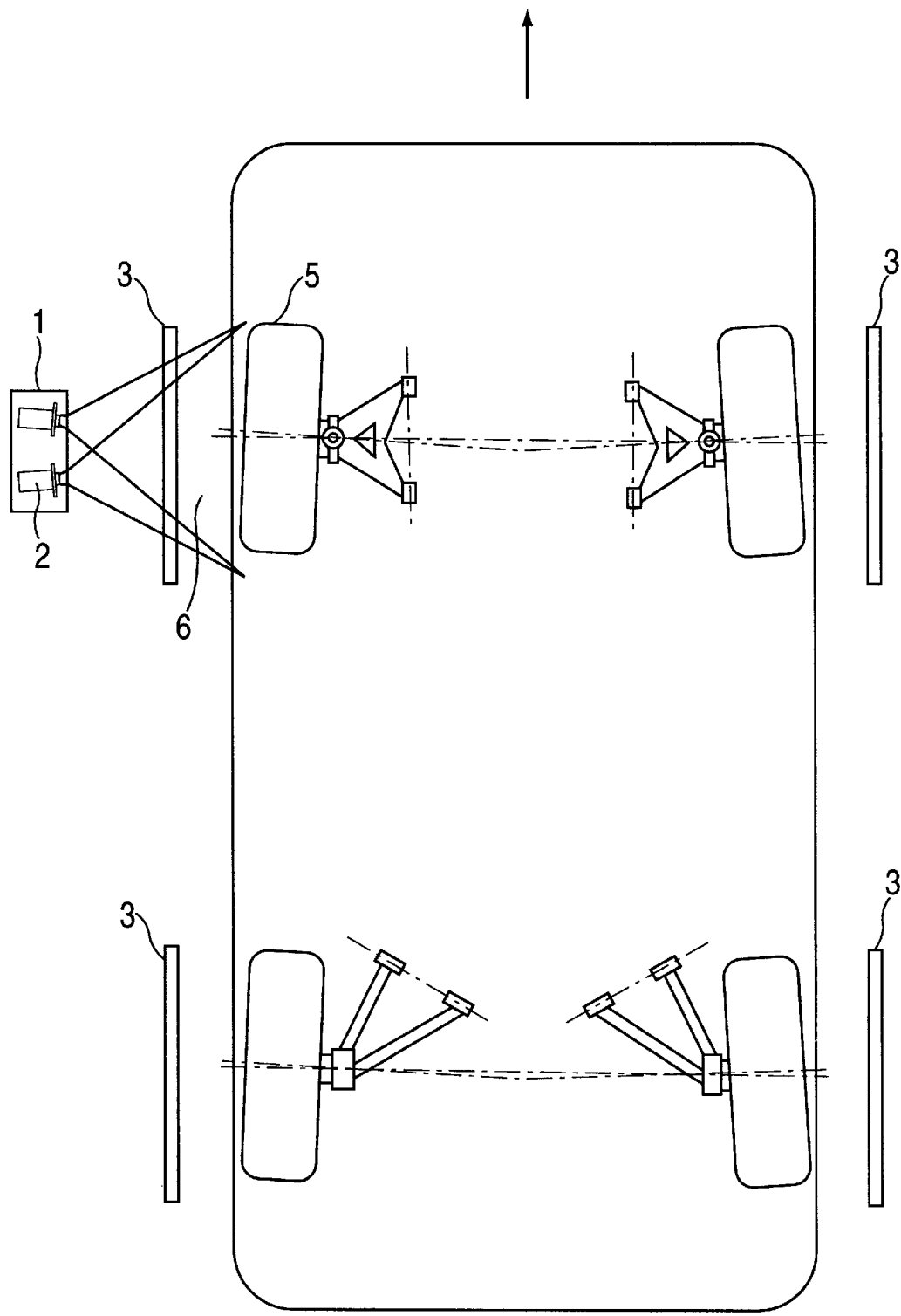
FIG. 3 shows an arrangement in accordance with FIGS. 1 and 2, in a plan view.

The trapezoidal frame, or a frame of a different form, having reference marks 4 arranged in a plane surface or spatially offset from one another, is anchored in the area of wheel 5 to the floor and can be secured, if desired, in a hinged or movable configuration. It must be insured, in this context, that it is placed in a known position, that is measured. As shown in FIG. 3, reference feature arrangements 3 of this kind are arranged or able to be arranged next to each wheel 5, so that the vehicle can be easily positioned therebetween.

To determine the geometrical wheel and axle data, images (or at least one per camera) of each wheel 5 are now recorded one after another, either using only one measuring head 1 having two cameras 2, and stored in an evaluation device; or the measuring operation is performed by configuring a plurality of measuring heads 1, at the same time, at a plurality of wheels 5. It also suffices, as well, to use only one camera 2, which can be shifted into a least two different measuring positions,, to record, in each case, reference marks 4 and measuring marks 8 in two successive measuring operations. For example, it is also possible to record all four wheels 5, including measuring marks 2 applied accordingly thereto, from an appropriate position above the vehicle (or before it or behind it), when measuring marks 8 are secured by mount fixtures projecting at a suitable distance beyond wheels 5.

Before image recording begins, measuring head 1, for the most part, is to be roughly positioned laterally next to wheel 5 and reference feature arrangement 3, so as to enable wheel 5 and reference feature arrangement 3 (i.e., an adequate portion thereof) to be recorded by cameras 2 of measuring head 1, and so as not to exceed a maximum distance to wheel 5. To provide support to the operator of the device, the measuring head is preferably equipped with an appropriate positioning aid (measuring surface/object space and distance). The stored images are now evaluated using known image processing and triangulation methods, so that the coordinates of measuring marks 8 secured to wheel 5 are obtained in relation to reference feature arrangement 3.

On the basis of the coordinates of measuring marks 8 of each wheel 5, as well as the positions of reference systems 3 known to the evaluation device, and with the previously determined wheel rim wobble, one can now arithmetically determine the vehicle's coordinate system (for example, longitudinal axis/plane of the vehicle, i.e., driving axis) and the following geometrical wheel and axle data: track for each wheel, total track, camber for each wheel, front/back wheel offset, right/left lateral offset, track width difference, and axle offset.

These geometrical data are available as angular sizes, but can also be specified in units of length. The specifications can also include the track width. By applying additional measuring marks at defined points on the automobile body (in the area of the wheel section), one can additionally determine the deflection or load condition of each wheel 5 and/or the inclination of the automobile body in the longitudinal and transverse directions. This makes it possible to quickly ascertain deviations from a predefined uniformity of the load condition and, if necessary; to correct it through appropriate loading/unloading, or to allow for it in vehicle-specific correction calculations.

Further geometrical wheel and steering data are determined at the steered wheels, in customary fashion, by turning wheels 5 by a defined steering angle. In the present method, the steering angle is determined from the change in the coordinates of measuring marks 8 secured to wheel 5, as are the values for caster, steering axis inclination, and toe-out on turns, as well as the position of the multi-link independent suspension as a function of the steering angle.

The axis of rotation is not only detected in its angles, but also in its spatial position in the measuring station. From this, one is able to derive the rolling radius of the wheels and additionally, therefrom, caster and steering axis inclination in units of length. To determine these geometrical data, a separate measuring head 1 is advantageously positioned laterally next to each steered wheel 5, so that the results for these wheels 5 can be displayed at the same time.

If the design of the device includes only one measuring head 1, then measurement operations must be performed in succession at each wheel 5.

In place of reference marks 4 and/or measuring marks 8, one can also utilize at least three characteristic points or characteristic edges each, as reference or measuring features to record and process images, the evaluation device identifying these images and defining their geometric position.

What is claimed is:

1. A device for determining a wheel and axle geometry of a motor vehicle in an inspection room, comprising:
   an optical measuring device including at least one optical image pick-up device that records images from at least two different image recording positions;
   a marking device including:
     a measuring feature arrangement that is arranged on at least one wheel and includes at least three measuring features per wheel, and
     at least one reference feature arrangement that includes at least three reference features per image recording position; and
   an evaluation unit, wherein;
     the inspection room is defined between the at least one reference feature arrangement and a base plane of a measuring station,
     a position of the at least one reference feature arrangement in the inspection room is accessible to the evaluation unit,
     the at least one optical image pick-up device is aligned from the at least two different image recording positions in order to record a portion of a grouping of the at least three measuring features and the at least three reference features sufficient for an evaluation, and
     a position of the at least three measuring features jointly recorded from the at least two different image recording positions is defined relative to the at least three reference features in order to determine the wheel and axle geometry.

2. The device of claim 1, wherein the at least one reference feature arrangement includes a mount support unit with an arrangement in the inspection room that is capable of being freely designed and on which the at least three reference features are provided as one of reference structures and marks.

3. The device of claim 1, further comprising:
   additional measuring features including one of automobile body structures and specially applied automobile markings, wherein the additional measuring features are capable of being recorded by the at least one optical image pick-up device, and wherein the additional measuring features are capable of being included in the evaluation.

4. The device of claim 1, wherein the at least three reference features are offset with respect to one of the at least two different image recording positions.

5. The device of claim 1, wherein at least one of the at least three reference features and the at least three measuring features are designed as retro-reflecting marks.

6. The device of claim 5, wherein the at least one optical image pick-up device includes a camera.

7. The device of claim 1, wherein:
 the at least one optical image pick-up device includes one image pick-up device that is capable of being positioned sequentially in two different positions to mutually detect one of all wheels of the motor vehicle, and all wheels on one side of the motor vehicle, and
 the evaluation unit stores and evaluates sequentially recorded data.

8. The device of claim 1, wherein:
 the at least one optical image pick-up device includes at least two optical image pick-up devices,
 the device for determining the wheel and axle geometry further comprises:
  one measuring unit arranged with respect to the at least two image pick-up devices, wherein:
   the at least two optical image pick-up devices are capable of being arranged in accordance with one of the following arrangements:
    at only one position to jointly record all wheels of the motor vehicle, sequentially on both sides of the motor vehicle at only one position each to jointly record all wheels per side, and
    sequentially at only one position per wheel, wherein the evaluation device stores and evaluates sequentially recorded image data.

9. The device of claim 1, further comprising:
 two measuring units, wherein:
  the at least one optical image pick-up device includes two sets of two optical image pick-up devices each,
  each of the two measuring units is arranged with respect to one of the two sets of optical image pick-up devices,
  the two measuring units are arranged on the motor vehicle according to one of:
   an arrangement placing the two measuring units on both sides of the motor vehicle such that each one of the two measuring units detects wheels on a corresponding side of the motor vehicle and both sides of the motor vehicle are sequentially detected,
   an arrangement placing each one of the two measuring units on a corresponding one of sides of the motor vehicle so that each measuring unit detects one wheel and both sides of the motor vehicle are sequentially detected, and
   an arrangement placing the two measuring units with respect to the motor vehicle such that one wheel of one vehicle axle is detected on both sides of the motor vehicle and vehicle axles are sequentially detected, and the evaluation device stores and evaluates sequentially recorded image data.

10. The device of claim 1, further comprising:
 four measuring units, wherein the at least one optical image pick-up device includes a plurality of optical image pick-up devices, are wherein each measuring unit is equipped with two of the plurality of optical image pick-up devices in order to enable simultaneous recording of all wheels of the motor vehicle.

11. The device of claim 8, further comprising:
 one optical measurement device that includes at least three cameras.

12. The device of claim 8, further comprising:
 at least one light source for illuminating the at least three measuring features and the at least three reference features, wherein:
  when retro-reflecting features are used, the at least one light source is arranged around a lens of the at least one optical image pick-up device.

13. The device of claim 12, wherein the at least one light source radiates light within a range that is invisible to the human eye.

14. The device of claim 1, wherein at least one of at least one of the at least three measurement features and at least one of the at least three reference features bears a detectable coding mark.

* * * * *